(12) United States Patent
Oliver Hoffmann et al.

(10) Patent No.: US 8,661,107 B2
(45) Date of Patent: Feb. 25, 2014

(54) BUSINESS NETWORK META MODEL

(75) Inventors: Frank Oliver Hoffmann, Wiesloch (DE); Joerg Ackermann, Heidelberg (DE); Christoph Liebig, Heddesheim (DE); Till Westmann, Schriesheim (DE); Ankur Bhatt, Bangalore (IN); Christian Illenberger, Ludwigshafen (DE); Gunther Rothermel, Rauenberg (DE); Daniel Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 517 days.

(21) Appl. No.: 12/902,978

(22) Filed: Oct. 12, 2010

(65) Prior Publication Data

US 2012/0089685 A1    Apr. 12, 2012

(51) Int. Cl.
*G06F 15/173* (2006.01)
(52) U.S. Cl.
USPC ............ 709/223; 709/203; 705/348; 717/104
(58) Field of Classification Search
USPC .......... 709/203, 206, 223, 224, 226; 707/601; 717/104; 705/348, 27.2, 7.31, 7.38; 726/25
See application file for complete search history.

(56) References Cited

U.S. PATENT DOCUMENTS

| | | | |
|---|---|---|---|
| 6,467,052 B1 | 10/2002 | Kaler et al. | |
| 6,601,233 B1 * | 7/2003 | Underwood | 717/102 |
| 7,421,699 B2 * | 9/2008 | Brendle et al. | 719/310 |
| 7,702,639 B2 * | 4/2010 | Stanley et al. | 707/999.1 |
| 7,831,453 B2 * | 11/2010 | Das et al. | 705/7.27 |
| 7,848,942 B2 * | 12/2010 | Sadiq | 705/7.11 |
| 7,912,749 B2 * | 3/2011 | Wong et al. | 717/104 |
| 8,438,533 B2 * | 5/2013 | Fritzsche et al. | 717/104 |
| 2004/0148586 A1 * | 7/2004 | Gilboa | 717/108 |
| 2006/0031540 A1 | 2/2006 | Purontaus et al. | |
| 2007/0106520 A1 * | 5/2007 | Akkiraju et al. | 705/1 |
| 2009/0182595 A1 | 7/2009 | Milaski | |
| 2009/0248473 A1 * | 10/2009 | Doenig et al. | 705/8 |
| 2010/0131857 A1 * | 5/2010 | Prigge | 715/744 |
| 2010/0302248 A1 | 12/2010 | Houghtlin et al. | |
| 2011/0153386 A1 * | 6/2011 | Kim et al. | 705/7.31 |
| 2012/0124140 A1 * | 5/2012 | Bhatt et al. | 709/206 |

FOREIGN PATENT DOCUMENTS

WO    2004/081827    9/2004

OTHER PUBLICATIONS

'Hypergraph' [online]. Wikipedia, 2008, [retrieved on Oct. 7, 2010]. Retrieved from the Internet: <URL: web.archive.org/web/20080415090010/http:/en.wikipedia.org/wiki/Hypergraph>, 4 pages.
'Metamodeling' [online]. Wikipedia, 2007, [retrieved on Oct. 7, 2010]. Retrieved from the Internet: <URL: web.archive.org/web/20071214003316/http:/en.wikipedia.org/wiki/Metamodeling>, 9 pages.
'Business Process Modeling Notation' [online]. Wikipedia, 2007, [retrieved on Oct. 7, 2010]. Retrieved from the Internet: <URL: web.archive.org/web/20071018142021/http:/en.wikipedia.org/wiki/BPMN>, 7 pages.

(Continued)

*Primary Examiner* — Frantz Jean
(74) *Attorney, Agent, or Firm* — Fish & Richardson P.C.

(57) ABSTRACT

A computer program product tangibly embodied in a computer readable storage device includes a business network meta model comprising entity objects configured to generate interactive representations of a business network, including at least a business application representation and an information technology representation.

15 Claims, 8 Drawing Sheets

(56) References Cited

OTHER PUBLICATIONS

'BPMN 2.0 Metamodel Implementation for Eclipse: Get it and Use it' [online]. SAP, 2010, [retrieved on Oct. 7, 2010]. Retrieved on the Internet: <URL:www.sdn.sap.com/irj/scn/go/portal/prtroot/docs/library/uuid/c04f0691-0a76-2d10-1098-ec518f7bdf68?QuickLink=index&overridelayout=true>, 13 pages.

'Modeling Your First Process with SAP NetWeaver Business Process Management' [online]. SAP AG, 2009, [retrieved on Oct. 7, 2010]. Retrieved from the Internet: <URL: http://www.sdn.sap.com/irj/scn/go/portal/prtroot/docs/library/uuid/c052052e-fbab-2b10-0d9a-9feed5463589?QuickLink=index&overridelayout=true>, 66 pages.

OMG, "Business Process Model and Notation (BPMN), Version 2.0" *Object Management Group*, 2010, pp.1-550.

'BPMN to BPEL case study solution in VIATRA2' [online]. Bergmann and Horvath, 2009, [retrieved on Oct. 7, 2010]. Retrieved from the Internet: <URL: http://is.tm.tue.nl/staff/pvgorp/events/grabats2009/submissions/grabats2009_submission_21.pdf>, 5 pages.

SAP AG, "SAP NetWeaver Business Process Management: Create and Adapt Business Processes Fast and Flexibly," *SAP Solution Brief*, 2008, 4 pages.

OMG, "Business Process Model and Notation (BPMN), Version 1.2," *Object Management Group*, 2009, pp. 1-316.

European Examiner Per Heselius, European Search Report & Written Opinion for Application No. EP 11007406, dated Nov. 22, 2011, 9 pages.

Jay J: "ActiveWin: Microsoft Vision 2000 Professional—Review", Internet Citation, Oct. 27, 2000, XP002351329, Retrieved from the Internet: URL: http://www.activewin.com/reviews/software/apps/ms/visio2k/index.shtml [retrieved on Oct. 26, 2005].

Tim Anderson: "Microsoft Visio 2002", Personal Computer World, London, GB, Jun. 28, 2001, pp. 1-4, XP002422569.

Tim Anderson: "Microsoft Visio 2003", Personal Computer World, London, GB, Sep. 18, 2002, pp. 1-2, XP002422570.

\* cited by examiner

BUSINESS NETWORK META MODEL

BACKGROUND

Business networks occur in many aspects of commerce. Each business network includes a set of participants, such as people, organizations, companies, who collaborate in various ways to conduct business. For example, the business involves manufacturing, storing, distributing or servicing goods, or delivering a product or service to a customer. Many of such participants have implemented enterprise resource planning (ERP) systems and other application systems for these purposes, to support their internal processes. For example, cross-organizational activities related to service delivered by the business network can interface with (or run within) application systems of one or more participants. Some business network participants may use additional information systems and information technology (IT) based process orchestrations to deliver the service.

Business processes running end-to-end in a business network are executed on local systems of various participants. Today, participants who wish to enable end-to-end business network operations and provide visibility into business network performance, may need to implement costly, risky and time consuming projects to deliver process integration into local applications. In the context of business networks, this business-IT dilemma may be exaggerated by a disconnect within or between participating organizations between, on the one hand, their individual IT situation, and on the other, their business language. The cost and complexity is further multiplied by the number of participants who must collaborate in a business network to achieve a common goal. This number ranges from fifty (at the low end) to many hundred in some enterprise settings. For each participant, the integration, operation and visibility needs to be addressed case-by-case, covering the end-to-end flow of business information and values, from activities within the private domain of one participant (e.g., the solicitation of a quote) to the partner's corresponding business activities (e.g., the confirmation of an order) and follow-up activities by related participants (e.g., production orders, shipping advice, etc.). Each partner-to-partner collaboration in the network needs to be implemented against autonomously designed information systems and integration technologies.

Generally, bringing information system support to a business network requires that mutual knowledge be acquired about the global view of the business network, or in a sense, of the network fabric. Most often, the required knowledge for such an integration is distributed over multiple or even many people in the organization. Typically, no single person has an end-to-end understanding of the business processes, organizations and IT landscape of their own organization, let alone those of all the involved participants. This lack of knowledge and the disconnect between participants (and their business and IT organizations) hinders the effective delivery of information system support for the collaborative business activities and business network lifecycle events. For example, effective support requires managing the evolution of the information system and business process operations, such as: on- or off-boarding participants, modifying process steps or information exchange, creating process variants due to regional or contractual variations, changing contracts regarding business rules and service level agreements (SLAs), ensuring continuous operations, and performing business optimization.

Some existing solutions perform modeling of business processes. For example, Business Process Modeling Notation (BPMN) is a graphical notation that depicts the steps in a business process.

SUMMARY

This document describes examples of business network meta models. As described below, a business network meta model can be used to generate interactive displays to illustrate and explain a business network. Such displays can focus on the business network from different perspectives. For example, a business application representation shows the business network from a business point of view, which is a perspective that executives and other business people within the business network may be most familiar and comfortable with. As another example, an IT representation shows the business network from an IT point of view, which is a perspective that may be preferred by IT managers, system administrators, developers and programmers. Because the displays are interactive, they provide seamless navigation and "drilling" within the various perspectives, which allows all relevant categories of users to see and understand their aspects of the network.

A meta model can be implemented as a multidimensional graph of nodes and edges. The meta model is configured to capture concepts of the business network. Particularly, the meta model facilitates an end-to-end picture to be assembled and synthesized from the individuals' perspectives, using information gathered about the network by agents enabled by multiple participants.

In some implementations, the characteristics of the business network are learned using an automatic discovery process. For example, agents (e.g., software utilities) are activated by one or more business network participants. The information gathered by the agents is collected, coordinated and processed, and used in creating the instance of the business network meta model for that particular business network.

Concepts of the business network that the meta model captures include: the concept of a particular participant and a particular business relation to one or more other participants in the business network. For example, the participants can include a retail store in one city, a warehouse in another city, and a shipper. These participants can be related by a relationship corresponding to the shipping transaction from the warehouse via the shipper to the retail store. Here, the meta model captures the semantics of the business network at the level of things, for example, entities which are real and active in the real world. For this, an ontology can be defined which is domain specific for process integration in business networks supported by information systems. The data meta model is designed to fit the semantics of the business network, and therefore enables capturing and processing of information that reflects those semantics. Such semantics can include, for example: From the IT perspective, application systems, integration middleware systems, and business-to-business (B2B) systems; and from the business perspective, applications artifacts such as business documents, business flows and business participants.

In some implementations, the meta model captures the extent of the business network constituents at the level of things. It also captures and identifies the individual relationships of the constituents. The meta model therefore captures semantics beyond a blueprint of a business network that has abstract roles and process steps. That is, the information captured in the meta model allows visibility into ongoing activities along the relationships between individual participants. Such a meta model enables online exploration and analysis of business networks.

In some implementations, a meta model provides at least some of the following features:

1. Specialization of participants that represent nodes in the business network, such as Business Participant, Communication Participant, and Mediation Participant
2. Specialization of communication and flows that represent edges in the business network, such as Mediation Flow, P2P Message Flow, Pedestrian Flow, and Business Flow
3. Hypergraph capabilities based on Participant Link and Flow Link entities in the meta model
4. Network Space, Network Snapshot and Domain as segmentations of an instance of the business network meta model
5. Business Entity and Business Term as proxy entities for business objects
6. Fact Sheet and Data Services to model business behavior and application access
7. Service Interface, Service Binding and Service Operation as extensions to describe services in the business network
8. Visualization of integration messaging pipelines as process collaboration activities In a first aspect, a computer program product tangibly embodied in a computer readable storage device includes a business network meta model comprising entity objects configured to generate interactive representations of a business network, including at least a business application representation and an information technology representation.

Implementations can include any or all of the following features. At least some of the entity objects correspond to participants and communications, respectively, in the business network. A participant entity object is configured to be selectively specialized to represent either of at least business participant in the business network or communication participant in the business network. The participant entity object specialized to represent the business participant is assigned a business semantic, and wherein the participant entity object specialized to represent the communication participant is assigned an information technology semantic. The participant entity object is also configured to be selectively specialized to represent a mediation participant in the business network.

A communication entity object is configured to be selectively specialized to represent either of at least physical message flow in the business network, or business message flow implemented using the physical message flow. At least one of the entity objects corresponds to a flow link for associating the physical message flow with the business message flow it implements The communication entity object representing the physical message flow is further configured for a drill-down operation where the communication entity object represents another physical message flow and a communication participant in the business network.

A network entity object is configured for generating a diagram showing the participants and the communications in the business application representation or in the information technology representation. The network entity object is a superset of consolidated network entities available to all users, and enrichment network entities available only to their respective author. A domain the entity object is configured for assigning action-level access rights in the business network.

In a second aspect, a system includes output device; computer readable storage device having stored therein a business network meta model comprising entity objects; and processor configured to generate interactive representations of a business network at the output device using the business network meta model, including at least a business application representation and an information technology representation.

Implementations can include any or all of the following features. At least some of the entity objects correspond to participants and communications, respectively, in the business network. A participant entity object is configured to be selectively specialized to represent either of at least business participant in the business network or communication participant in the business network. The participant entity object specialized to represent the business participant is assigned a business semantic, and wherein the participant entity object specialized to represent the communication participant is assigned an information technology semantic. A communication entity object is configured to be selectively specialized to represent either of at least physical message flow in the business network, or business message flow implemented using the physical message flow. The communication entity object representing the physical message flow is further configured for a drill-down operation where the communication entity object represents another physical message flow and a communication participant in the business network.

In a third aspect, a computer program product is tangibly embodied in a computer-readable storage device. The computer program product includes instructions that, when executed, generate in a display device area a graphical user interface. The graphical user interface includes: a business application representation of a business network; and an information technology representation of the business network. The representations are interactive and include entity objects of a business network meta model.

Implementations can include any or all of the following features. At least some of the entity objects correspond to participants and communications, respectively, in the business network, and wherein a network entity object is configured for generating a diagram showing the participants and the communications in the business application representation or in the information technology representation. The network entity object is a superset of consolidated network entities available to all users, and enrichment network entities available only to their respective author.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
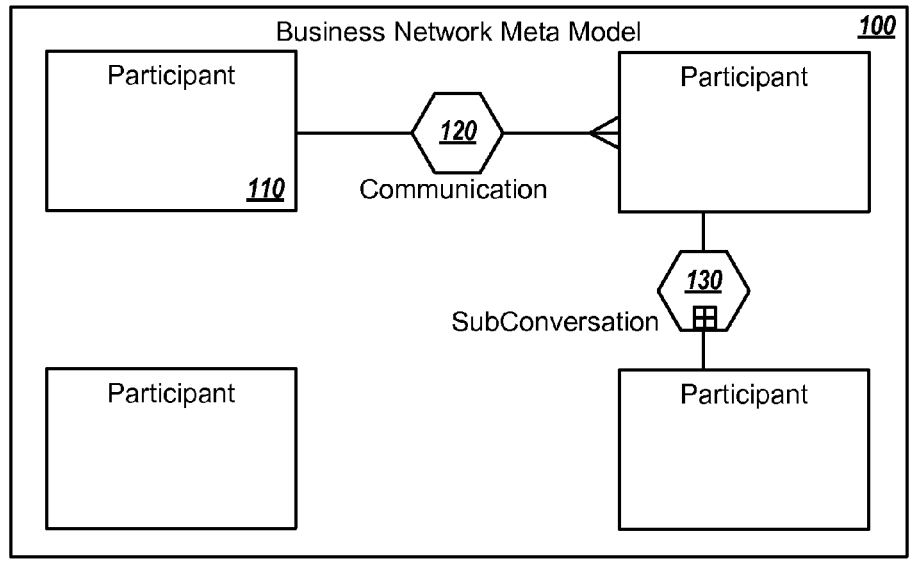
FIG. 1 schematically shows an example of a business network meta model.

FIG. 1 schematically shows an example of a business network meta model 100. The meta model is designed for describing instances of business networks by introducing appropriate entities and relations between entities. Here, entity objects in the meta model 100 include: Participant entity objects 110, a Communication entity object 120 and a Sub-conversation entity object 130. The entity objects 110-130 are here graphically illustrated as geometric shapes, but in a real situation the objects would be implemented using code, scripts, tables, libraries or other computer-readable structures. The meta model 100 can be implemented as a computer program product for storage in a computer readable storage device.

In some implementations, the meta model 100 is designed to meet at least the following criteria:

1. Is able to describe participant types and communication between them.
2. Is a typed model.
3. Allow persistency of model instances.
4. Is serializable (completely or partly).
5. Allows collaboration between users.
6. Allows grouping (e.g., of network segments).
7. Includes access control mechanisms
8. Allows tenant-specific separation.

For the above and other reasons, a number of design principles can be established and used when creating a business network meta model. Examples of such design principles are:

A. The meta model provides all entities, relations, activities and sequences that are necessary to semantically model Business Network instances.

B. The meta model uses a minimum of model entities for simplicity without losing expressiveness.

C. No model notation breaks the one-model approach: The same (meta) model is used by all target users.

D. The meta model is based on standard modeling notations.

E. The meta model is persistable due to user specific enrichments of the model that cannot be computed from source data.

F. The meta model can be created from discovered and consolidated integration middleware data. For example, the meta model can be computed from an SAP NetWeaver Process Integration configuration.

G. Parts of the meta model can be converted back into the integration middleware objects for change.

The following are examples of entity objects that can be included in the meta model 100 and their respective interactions and characteristics. A Network can be produced as a collection of all Participants and Communications that a discovering agent is able to find during a discovery process. The Network is used as entry point for visualization, operation, enrichment, change and other business network related use cases. Participants might communicate with other Participants, which is expressed as Communication. A Participant however might currently not take part in Communications, but is principally able to be connected.

The Participant here has two major specializations. It can either be a BusinessParticipant or a CommunicationParticipant. CommunicationParticipants are entities from an IT perspective, such as an application system or a B2B service endpoint.

These business network features can be discovered by reading IT-related sources such as a System Landscape Optimization documentation, an Online Analytical Processing directory, or a process integration configuration. BusinessParticipants are entities from a business application perspective, such as: a B2B partner, the application itself, or an application artifact that is related to a communication—e.g., a store in distribution processes. Further specializations of BusinessParticipant and CommunicationParticipant can be used. In some implementations, the BPMN SubConversation is used to aggregate Communications, other SubConversations and MessageFlows.

A Domain is a subset of Net entities built to assign access rights via AccessControlLists. Following the idea of directory services (e.g. ActiveDirectory or Lightweight Directory Access Protocol) Domains can be strict hierarchically structured by associating multiple CategoryValues. In this case Domains can form a tree. A typical use-case for Domains is multi-tenant structuring. Domains are managed by Business Network Management administrators.

A NetworkSpace represents a subset of Network entities defined by a user for purposes of particularly working with that subset. The user can assign arbitrary entity objects to the NetworkSpace from all Domains to which the user has access rights. The user can propagate access rights regarding his or her NetworkSpace to other users, and thereby share the NetworkSpace. However, the Domain-based access rights have higher priority.

Figure 2:
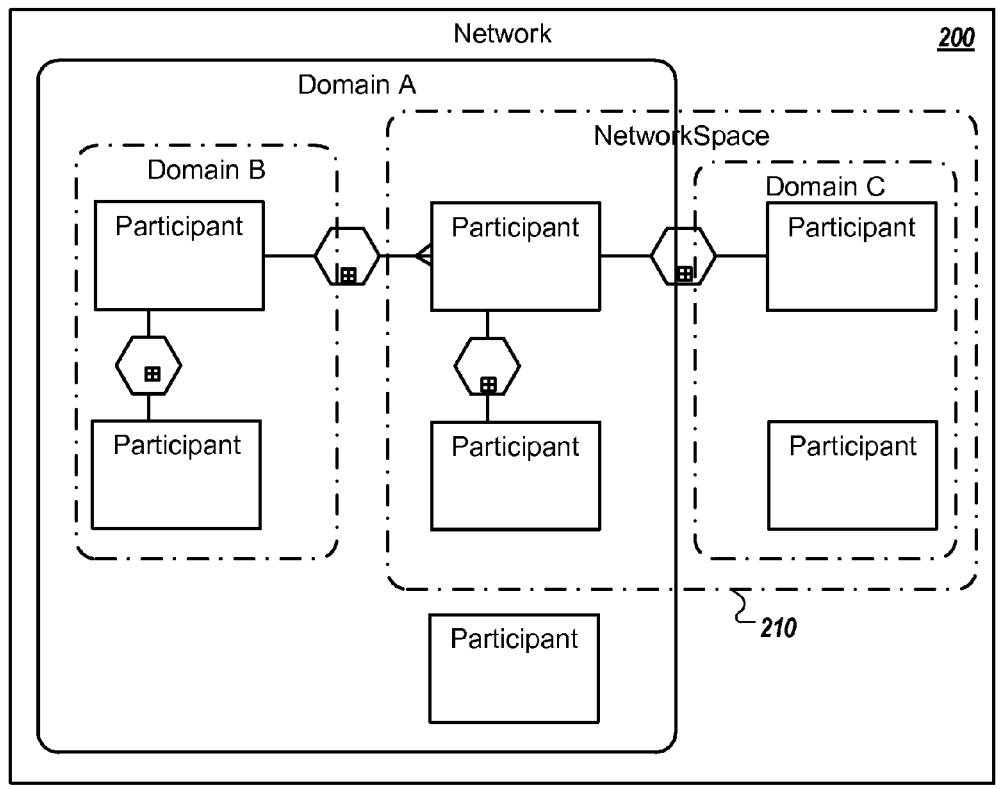
FIGS. 2-5 show examples of business networks with participants and relationships.

FIGS. 2-5 show examples of business networks with participants and relationships. In FIG. 2, a network 200 is structured into three domains, namely domain A with a sub-domain B, and a disjunctive domain C. Now, a user with access rights to domains A and C defines a network space 210 from both these domains to work with. A second user with access rights for domain B only, could neither create the network space 210, nor collaborate on it with the first user, even if the first user shares the network space 210 with the second user.

NetworkSpaces are the work spaces for users in business network management. Changes in the NetworkSpace are also visible in an overall network view, once they are "released". To make changes, the user either modifies an entity directly (globally) or creates a copy of it (locally). In such situations, a Participant in the model could refer to the identical real entity. ParticipantAssociations are here extended to ParticipantLinks allowing diagram-independent declaration of links. ParticipantLinks may not be visualized in the Network view but rather as an object attribute.

Figure 3:
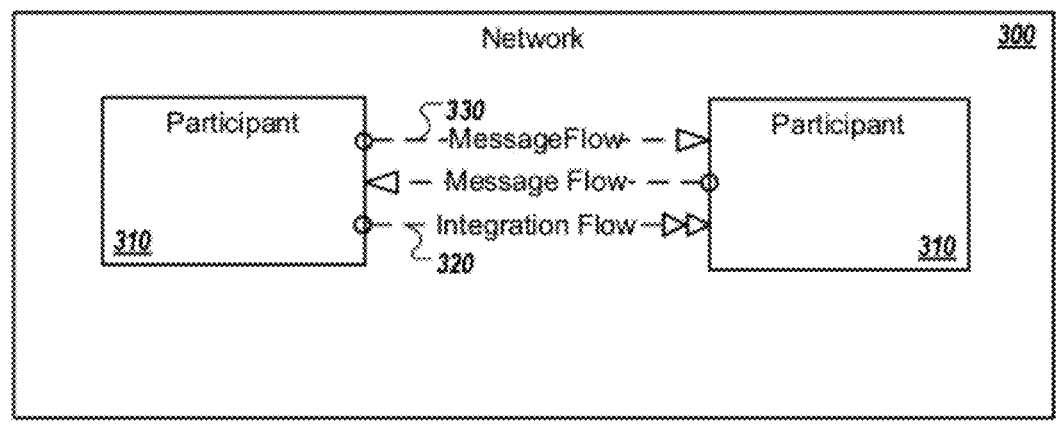

The meta model reflects interaction between participants. FIG. 3 shows a network 300 with participants 310 that communicate with each other. In the meta model, an IntegrationFlow 320 is a specialized MessageFlow 330 with a particular graphical notation. The IntegrationFlow indicates that middleware capabilities are used while transporting the message. For point-to-point connections without mediation, a standard MessageFlow entity can be used.

A MessageFlow shows the transport of one message from Participant to Participant. In case of asynchronous request/confirmation and synchronous request/response patterns, two MessageFlows can be added, one for each direction. The MessageFlow can have several specializations, for example: A P2PMessageFlow represents a direct communication between two Participants without integration in between. A Pedflow (i.e., "Pedestrian Flow") indicates a message flow without IT in between, e.g. letter or phone call.

Figure 4:
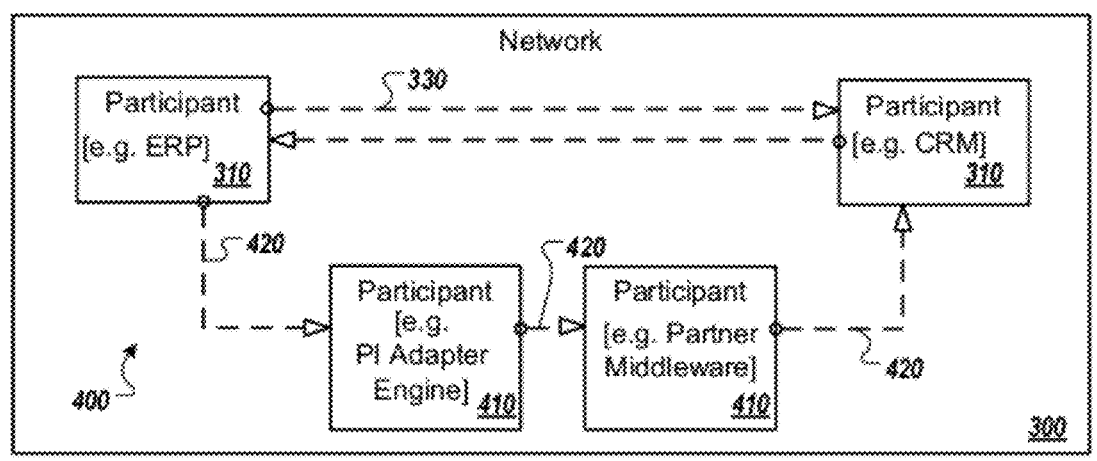

An IntegrationFlow in turn can be expanded further into the MessageFlow notation depicting involved middleware components as Participants. FIG. 4 shows the network 300 where the IntegrationFlow 320 between the participants 310 has been expanded into a MessageFlow 400 that includes Participants 410 and MessageFlows 420. For example, in a graphical representation, clicking on (or otherwise activating) the IntegrationFlow 320 causes it to disappear and instead the MessageFlow 400 is displayed.

Finally, more technical entity objects (such as ConnectionParticipants, P2PMessageFlow, IntegrationFlow, etc.) implement some business related processing and communication. The business view, however, is not tightly bound to the technical landscape but may follow different structuring. For example, a particular business document flow might consist of multiple technical MessageFlows of different types. A business participant in turn might be an organizational entity that receives or sends a message, but it could also be merely an application artifact in some application system. For these reasons, the BusinessParticipant entity (with some specializations) and the BusinessFlow can be used.

Figure 5:
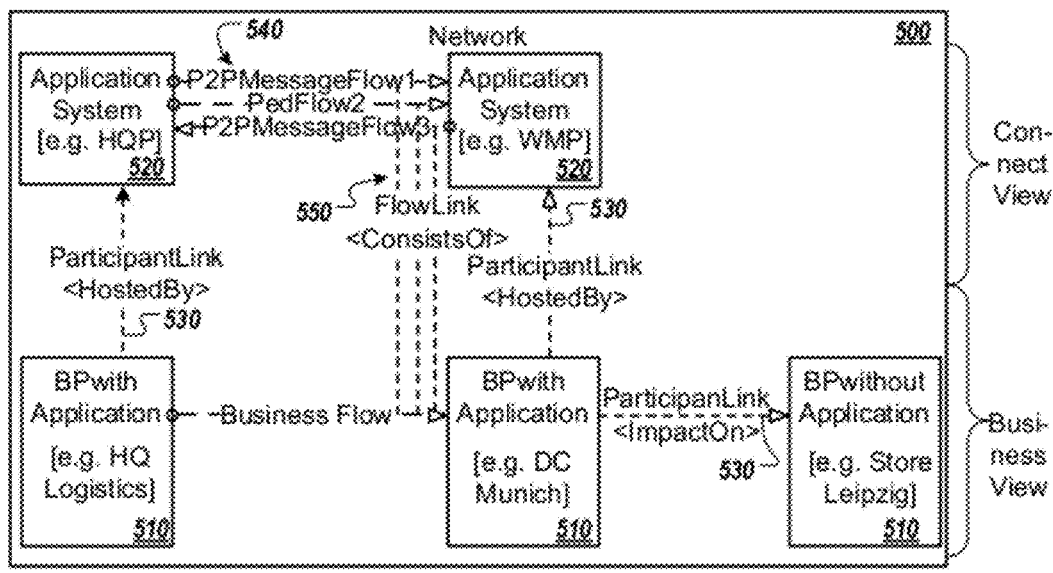

Accordingly, various kinds of links can be used to model a business network. FIG. 5 shows a network 500 where BusinessParticipants 510 are linked to CommunicationParticipants 520 via ParticipantLinks 530. BusinessFlows 540, in turn, are linked to other MessageFlows by FlowLinks 550.

A communication can be related to a BusinessParticipant entity which does not receive or send a message itself (i.e., is not a target or source of a MessageFlow). For example, a store in a distribution process may not be the source or target of an OutboundDelivery message, but will instead receive the goods physically via a truck. The OutboundDelivery message is processed by the distribution center application server that manages the store's stock. In this case the managed store may be called a BPwithoutApplication, which is a Participant. The association between the managing Participant and the BPwithoutApplication can be modeled with one or more ParticipantLinks. Usually, neither a BPwithoutApplication nor a BusinessFlow can be discovered by an automated discovery process (e.g., a process that releases agents in the business network). However, the BPwithoutApplication or the BusinessFlow can be created as part of an enrichment process, a user modifying the modeled business network.

Figure 6:
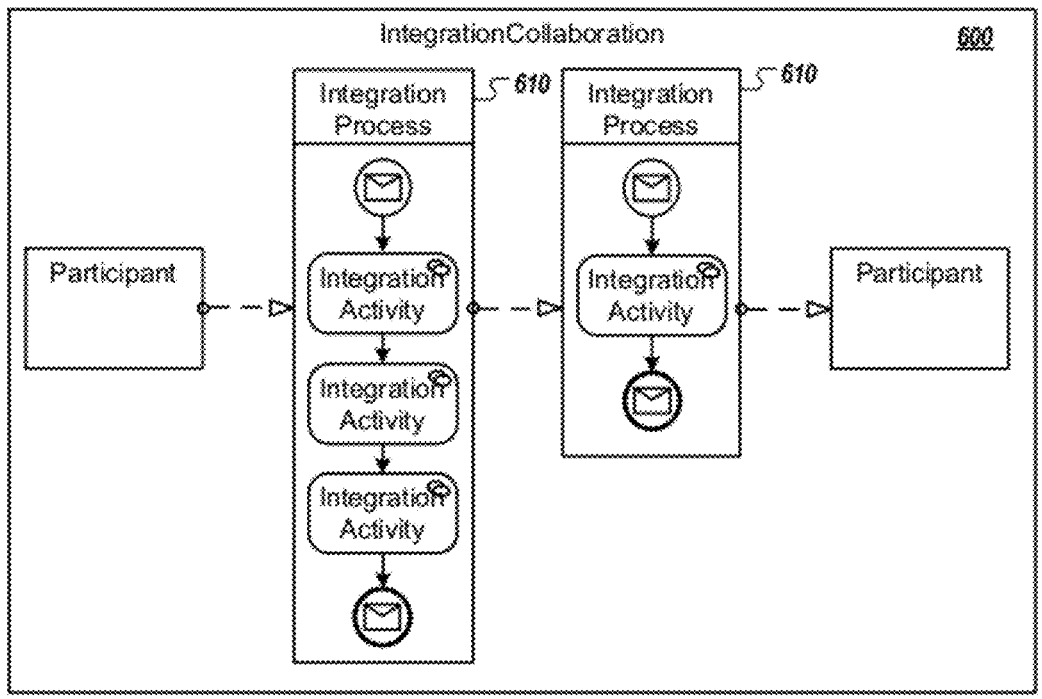
FIGS. 6-8 show examples of collaboration in business networks.
Figure 7:
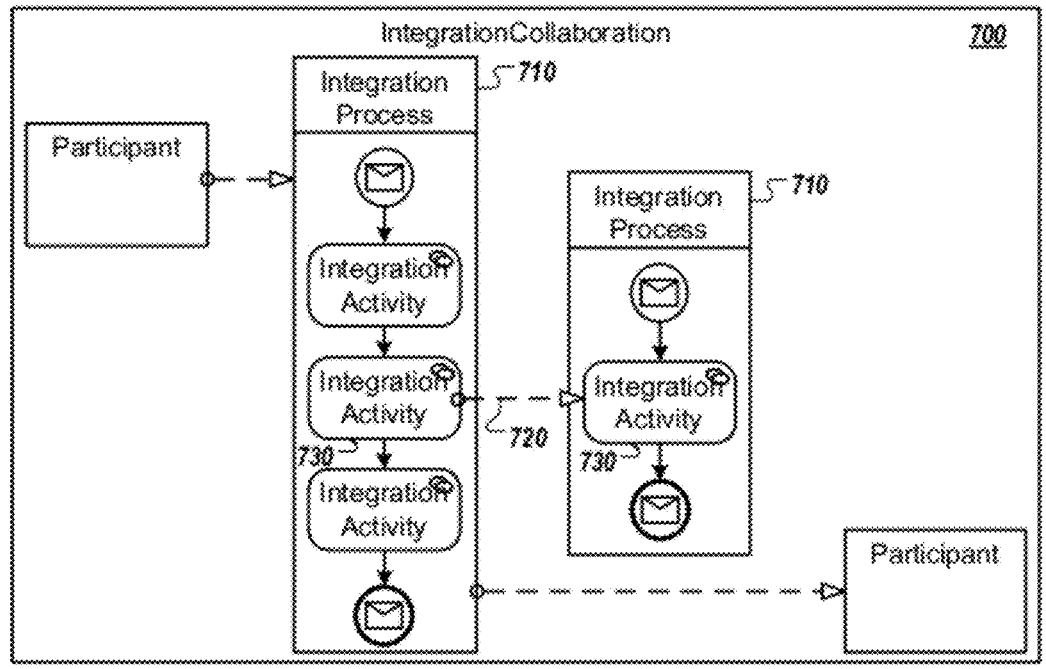
Figure 8:
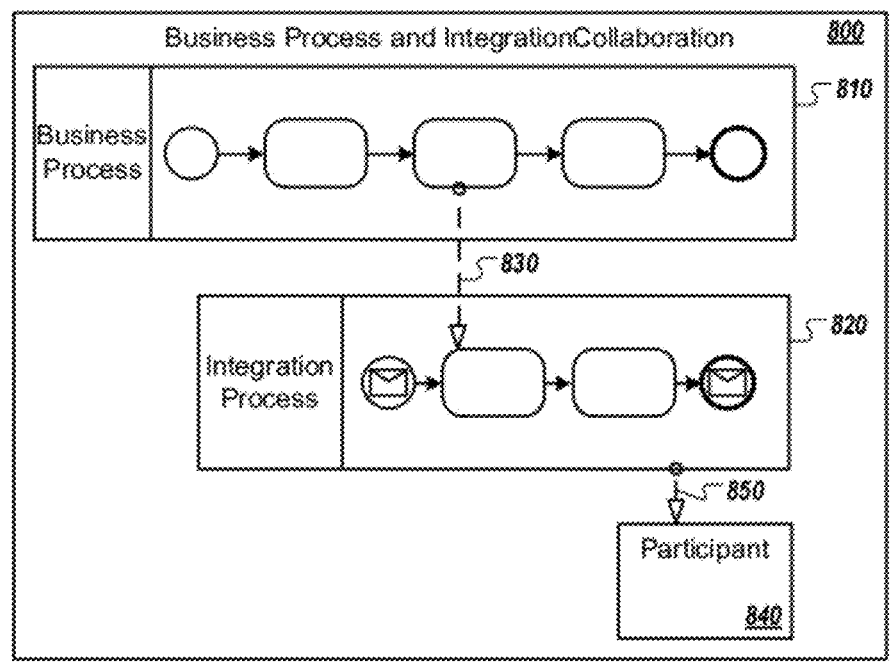

FIGS. 6-8 show examples of collaboration in business networks. In some implementations, the IntegrationFlow can be expanded into the entities IntegrationProcess and IntegrationActivity. FIG. 6 shows an IntegrationCollaboration 600 where IntegrationProcesses 610 of an IntegrationFlow run sequentially on different middleware components. For example, one middleware sends a sync message to an adapter hosted by another middleware to read application values. As another example, FIG. 7 shows an IntegrationCollaboration 700 where IntegrationProcesses 710 of an IntegrationFlow run in an orchestrated fashion, which can be expressed in a Collaboration diagram. Here, a MessageFlow 720 can be defined between IntegrationActivities 730 two flows.

In both of the above cases, a Participant uses an IntegrationFlow to communicate with another Participant. The IntegrationCollaboration diagram allows the IntegrationActivities to be visualized. The IntegrationProcesses 710 can either be fix or flexibly defined.

A seamless combination of business processes (either as blueprint or as executable process) and IntegrationProcesses can be achieved by linking a business process model using the meta model. For example, FIG. 8 shows an IntegrationCollaboration 800 where a Business Process 810 is linked to an IntegrationProcess 820 by a MessageFlow 830. The IntegrationProcess 820 is linked to a Participant 840 by a MessageFlow 850.

Figure 9:
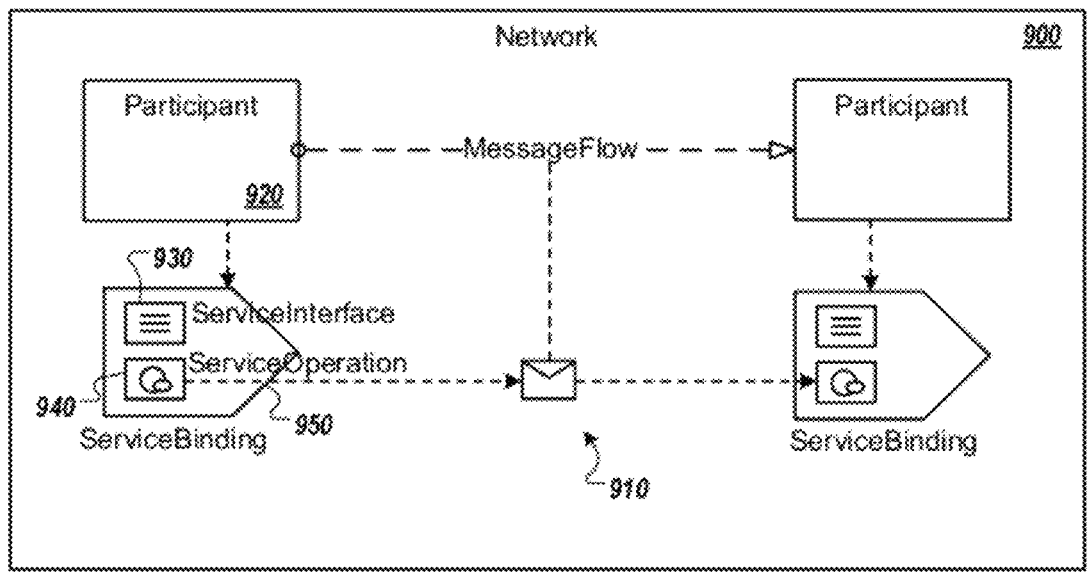
FIG. 9 shows an example of messaging in a business network.
Figure 10:
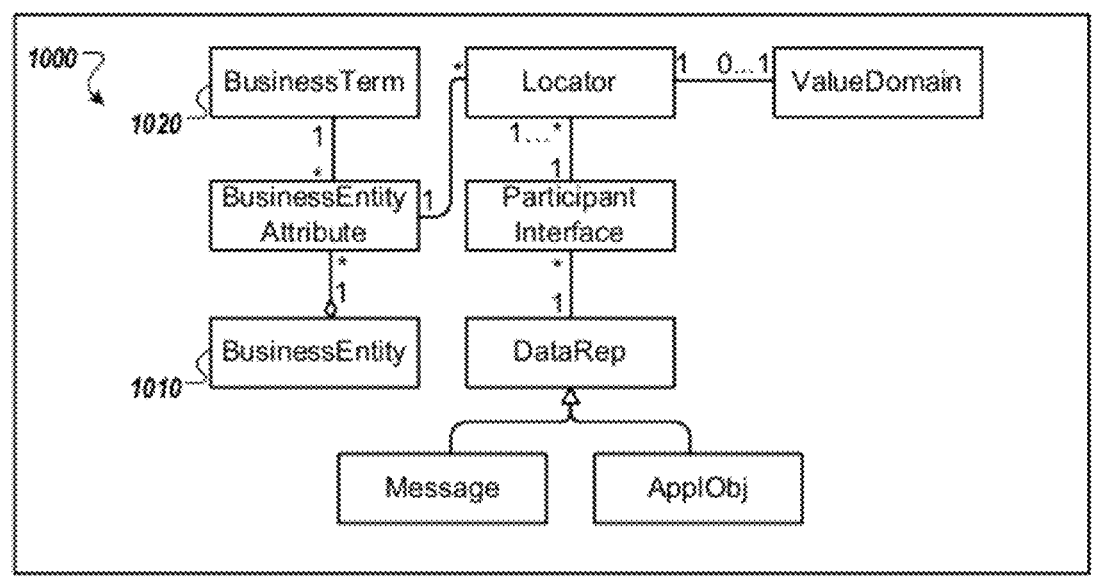
FIGS. 10-13 illustrate examples of relationships between business terms, business entities, participants and messages.

FIG. 9 shows an example of messaging in a business network 900. A Message 910 is used to transfer a data set and actions. A Participant 920 can be associated to a ServiceInterface 930, which describes the service data structure. Indirectly, by a further association, the Participant 920 can be associated to a ServiceOperation 940. The ServiceOperation 940 describes the action(s) executed on the data causing a certain message flow. For this reason, the ServiceOperation 940 is linked to the Message 910. A ServiceBinding 950, as a specialization of an EndPoint, defines the configuration data used for the message exchange. A web service definition language (WSDL) or service creation description language (SCDL) in the service component architecture (SCA) sense can be mapped to this entity triple. In some implementations, a service entity may be introduced to aggregate entity instances of ServiceInterface, ServiceOperation, and ServiceBinding.

A Message does not restrict the communication to asynchronous message transfer. It can be mapped to synchronous service calls (e.g., in a service-oriented architecture domain), to events (e.g., in an event-driven architecture), or to any kind of asynchronous messages used for application-to-application (A2A) or B2B communication. Various message exchange patterns (e.g. asynchronous request acknowledgement) can be used.

Configuration of service interface (structure), service operation (method), and service endpoint (binding) can be can be described using an extension point package. This can allow a seamless integration of SCA artifacts (e.g., interface, operation, binding) into the meta model.

In order to close the gap between business user and integration expert, application related artifacts can be introduced in some implementations. A BusinessTerm is a name for a scalar value or a tuple of values that is relevant to a business user. This value can be extracted at runtime from a concrete data representation (e.g., an application object or a message) and it can therefore be used for operations management. In a sense, a BusinessTerm is akin to a tag that can be attached to a value (e.g., in any part of a message, such as header, body or meta data).

The same BusinessTerm can be used in different forms in different data representations. It is therefore also possible to have different values for the same BusinessTerm for different data representations, even if those data representations refer to the same real-world object. There is no canonical value for a BusinessTerm in a system. Instead, mappings associated with a BusinessTerm can map the form of a value in one system to the form of the same value in another system.

Technically, a BusinessTerm comprises locators to identify this value in different design time artifacts (such as data types, schemas, message types) and runtime artifacts (application objects and messages). In an XML centric scenario such a locator could be as simple, relatively speaking, as a single XPath expression for design time and runtime.

Because a BusinessTerm can refer to a tuple of values, it can also includes more than one locator. Also, because different systems can use the same message type in different ways, the concrete locator can also be interface dependent. Each locator refers to a value domain, which is the domain of all legal values that can be identified by the locator at runtime. The value domain for each locator includes the domains for the values (i) that are the basis for a value mapping between the between different representations of a BusinessTerm, and (ii) that can be returned by a DataService. The locators form a link between the semantically rich BusinessTerms and the data that is used and exchanged in a system. This link can be used for many purposes, among them translation of business related SLAs to operational SLAs, that can then be monitored and enforced. To determine this link, any suitable semantic integration technologies can be employed.

FIGS. 10-13 illustrates examples of relationships between business terms, business entities, participants and messages. For example, a relationship 1000 involves a BusinessEntity 1010 that includes a set of views on a collection of real-world objects (RWOs). Each view is based on the representation of the same RWO in a different system. Each view should provide comparable (or the same) information about the RWO. There is a 1-1 relationship between BusinessEntities and collections of RWOs in a specific role. For example, a Customer entity and a Partner entity can both relate to collections that contain the same company, but the company would be in different roles.

Technically, the views are given as a collection of BusinessTerms 1020. So the information about the data of a BusinessEntity is accessed via the locators associated with the BusinessTerms. BusinessEntities can also be related to other BusinessEntities.

Because BusinessTerms can be shared between two or more BusinessEntities, a shared BusinessTerm is one way to indicate, and also to represent, a relationship between BusinessEntities. Business SLAs that relate to a subset of the BusinessTerms that are part of a BusinessEntity can also be associated with that BusinessEntity. Business SLAs are logical conditions and rules which assert an expected behavior or outcome of collaborative business activities (e.g., the expected delivery time shall not be exceeded by more than one business day). Business SLAs can be monitored and evaluated against instances of business transactions and message flows in a business network. BusinessEntities can be associated with the Participants in a Net.

Figure 11:
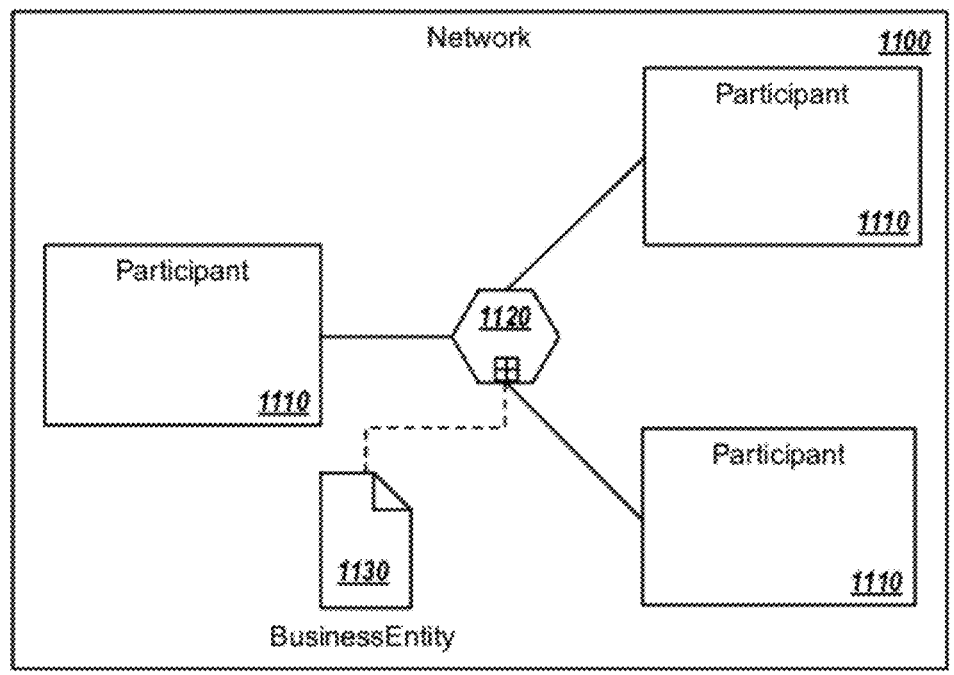
Figure 12:
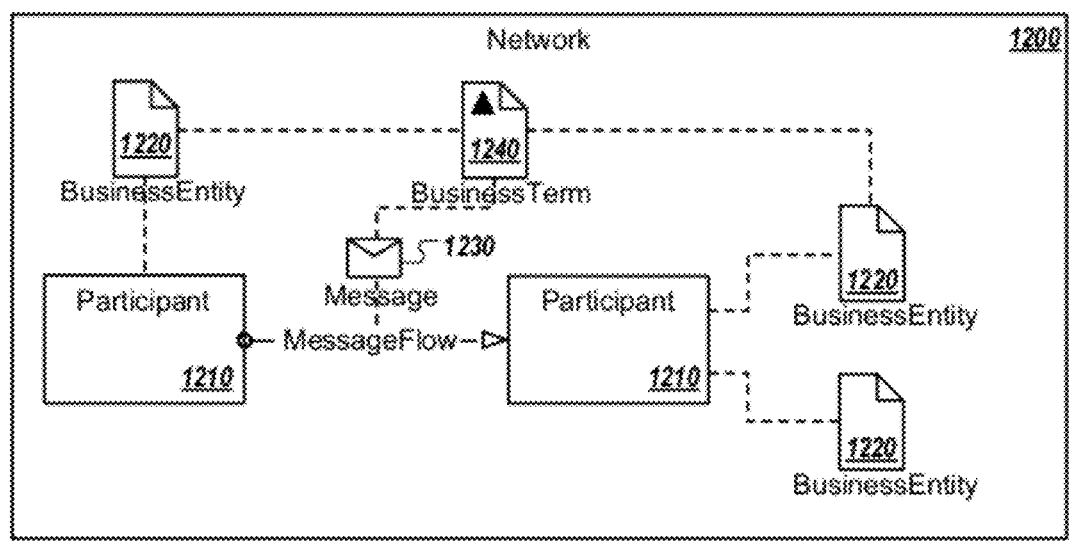

In some implementations, all Participants use the same BusinessEntity. For example, FIG. 11 shows a Network 1100 where Participants 1110 interact with each other using Communication 1120, and a BusinessEntity 1130 (e.g., an SLA or other business document) is associated with the Communication 1120. As another example, FIG. 12 shows a Network 1200 where Participants 1210 interact with each other using BusinessEntities 1220 and a message 1230 that all use one or more common BusinessTerms 1240.

Figure 13:
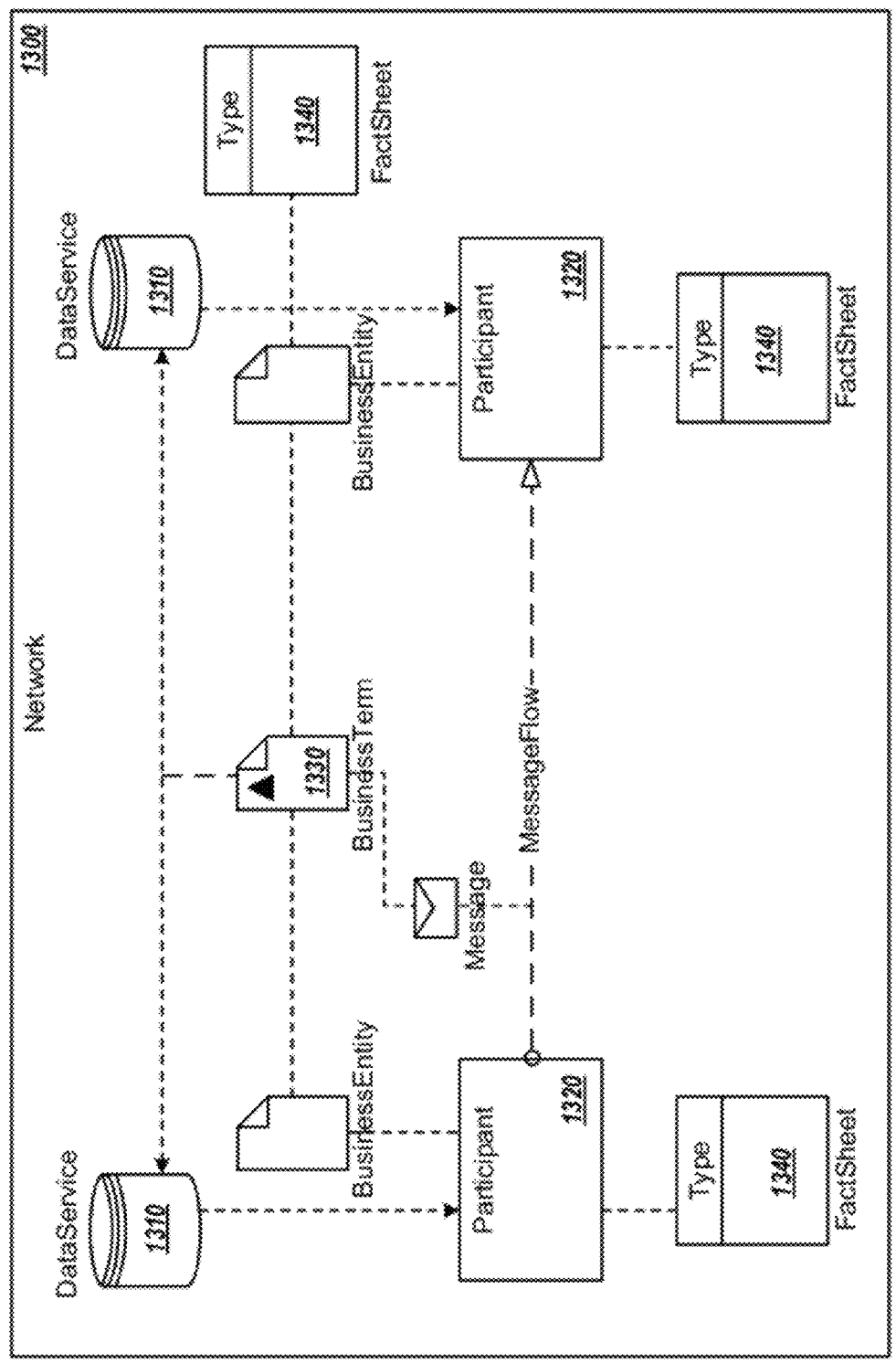

FIG. 13 shows a Network 1300 having DataServices 1310. The DataServices describe the access to data whose lifecycle is managed by a Participant 1320. For example, a database table with application specific identifiers needed for value mapping in an IntegrationFlow, could be exposed and used by the middleware. In some implementations, the DataServices are enrichment entities, meaning that they are user-modeled rather than automatically discovered. If middleware components support value mapping population, then DataServices can be a deployable entity.

The DataServices 1310 can be associated with, for example: The Participants 1320 since the DataServices manage the data and expose an access to it; with BusinessTerms 1330 as consumer; and with IntegrationActivities as consumer (see, e.g., FIGS. 6 and 7).

FactSheets 1340 are data containers for collecting additional information and references for certain entities. The FactSheets can be specialized for one or more entities and can have multiple sections, for example references to general entity attributes, specific entity attributes, technical information from operation data consolidation, and collaboration data such as contact information. In some implementations, the selection of the data to be presented in the graphical user interface can be user-specific.

The enclosed Appendix containing pages i-x is incorporated herein by reference. The Appendix includes four tables with descriptions of entities in an example implementation termed Network Integration Meta Model (NIMM).

Figure 14:
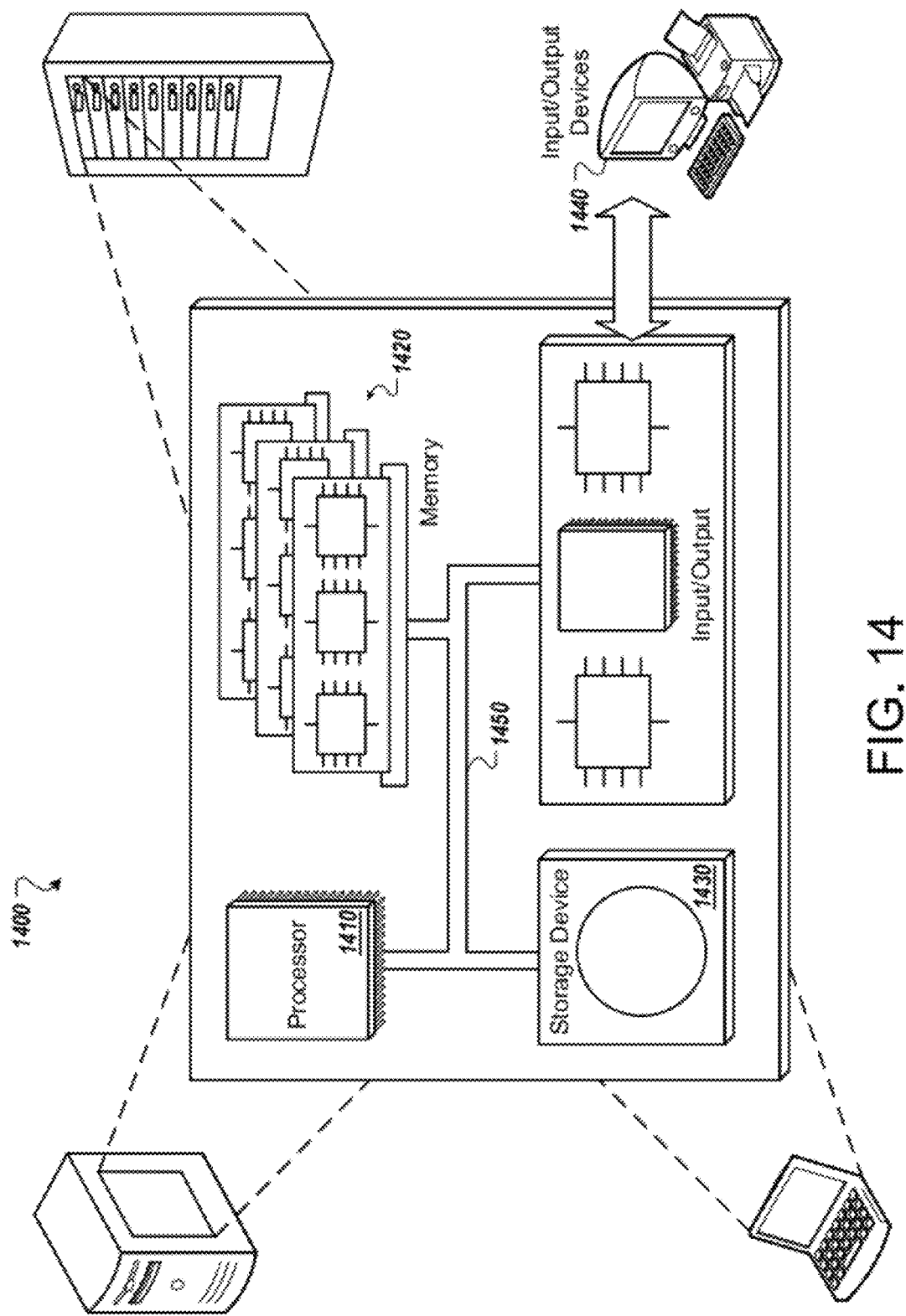
FIG. 14 is a block diagram of a computing system that can be used in connection with computer-implemented methods described in this document.

FIG. 14 is a schematic diagram of a generic computer system 1400. The system 1400 can be used for the operations described in association with any of the computer-implement methods described previously, according to one implementation. The system 1400 includes a processor 1410, a memory 1420, a storage device 1430, and an input/output device 1440.

Each of the components 1410, 1420, 1430, and 1440 are interconnected using a system bus 1450. The processor 1410 is capable of processing instructions for execution within the system 1400. In one implementation, the processor 1410 is a single-threaded processor. In another implementation, the processor 1410 is a multi-threaded processor. The processor 1410 is capable of processing instructions stored in the memory 1420 or on the storage device 1430 to display graphical information for a user interface on the input/output device 1440.

The memory 1420 stores information within the system 1400. In some implementations, the memory 1420 is a computer-readable medium. The memory 1420 is a volatile memory unit in some implementations and is a non-volatile memory unit in other implementations.

The storage device 1430 is capable of providing mass storage for the system 1400. In one implementation, the storage device 1430 is a computer-readable medium. In various different implementations, the storage device 1430 may be a floppy disk device, a hard disk device, an optical disk device, or a tape device.

The input/output device 1440 provides input/output operations for the system 1400. In one implementation, the input/output device 1440 includes a keyboard and/or pointing device. In another implementation, the input/output device 1440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
   generating, by a computing system, an interactive display of a business network meta model graph that illustrates a business network, the interactive display of the meta model graph including nodes and edges that are displayed between the nodes, wherein each of the nodes represents a real world participant in the business network, and each of the edges represents a real world interaction between two of the participants of the business network, wherein
      some of the edges are peer to peer message flow edges that represent a direct communication between two of the participants in the business network without a middleware participant between the two participants,
      some of the edges are integration flow edges that represent a communication between two of the participants in the business network that involved a middleware participant between the two participants, and
      each of the integration flow edges is displayed with a particular graphical notation that is different than a graphical notation displayed for the peer to peer message flow edges;
   presenting, by the computing system, the interactive display of the business network from a business application perspective in which each of the participants is identified as being a business entity;
   presenting, by the computing system, the interactive display of the business network from an information technology perspective in which each of the participants is identified as being an application system; and
   receiving, by the computing system, user selection of a particular one of the integration flow edges that is shown as connecting a first participant of the participants in the business network to a second participant of the participants in the business network, and as a result causing the particular one of the integration flows to disappear from the display, and instead having the display present one or more middleware participants in connection to the first participant and the second participant with one or more of the peer to peer message flow edges.

2. The computer-implemented method of claim 1, wherein:
   some of the participants represent real world retail stores and real world warehouses, and
   some of the edges represent shipping transactions from respective warehouses to respective retail stores.

3. The computer-implemented method of claim 1, further comprising:
   receiving, by the computing system, an indication that a first user has assigned a subset of the nodes in the business network to a network space;
   receiving, by the computing system, an indication that the first user has shared the network space with a second user; and
   preventing, by the computing system and in response to identifying that the second user has access rights to only some of the nodes that the first user assigned to the network space, the second user from collaborating with the first user on the shared network space despite the first user having shared the network space with the second user.

4. The computer-implemented method of claim 1, wherein some of the edges are pedestrian flow edges that represent a physical mailing of a letter between two of the participants of the business network.

5. A computer-implemented method, comprising:
   generating, by a computing system, an interactive display of a business network meta model graph that illustrates a business network, the interactive display of the meta model graph including nodes and edges that are displayed between the nodes, wherein each of the nodes represents a real world participant in the business network, and each of the edges represents a real world interaction between two of the participants of the business network, wherein some of the edges are participant link edges that represent an association between two of the participants of the business network, where the two participants of the business network that are connected with a participant link edge do not communicate electronically with each other and one of the two participants is a non-application entity that sends or receives physical goods and does not send or receive an electronic messages;
   presenting, by the computing system, the interactive display of the business network from a business application perspective in which each of the participants is identified as being a business entity; and
   presenting, by the computing system, the interactive display of the business network from an information technology perspective in which each of the participants is identified as being an application system.

6. A computer program product embodied in a non-transitory computer readable storage medium and comprising instructions that when executed by a processor perform operations comprising:
   generating, by a computing system, an interactive display of a business network meta model graph that illustrates a business network, the interactive display of the meta model graph including nodes and edges that are displayed between the nodes, wherein each of the nodes represents a real world participant in the business network, and each of the edges represents a real world interaction between two of the participants of the business network, wherein some of the edges are peer to peer message flow edges that represent a direct communication between two of the participants in the business network without a middleware participant between the two participants, some of the edges are integration flow edges that represent a communication between two of the participants in the business network that involved a middleware participant between the two participants, and each of the integration flow edges is displayed with a particular graphical notation that is different than a graphical notation displayed for the peer to peer message flow edges;

presenting, by the computing system, the interactive display of the business network from a business application perspective in which each of the participants is identified as being a business entity;

presenting, by the computing system, the interactive display of the business network from an information technology perspective in which each of the participants is identified as being an application system; and receiving, by the computing system, user selection of a particular one of the integration flow edges that is shown as connecting a first participant of the participants in the business network to a second participant of the participants in the business network, and as a result causing the particular one of the integration flows to disappear from the display, and instead having the display present one or more middleware participants in connection to the first participant and the second participant with one or more of the peer to peer message flow edges.

7. The computer program product of claim 6, wherein: some of the participants represent real world retail stores and real world warehouses, and some of the edges represent shipping transactions from respective warehouses to respective retail stores.

8. The computer program product of claim 6, the operations further comprising:

receiving, by the computing system, an indication that a first user has assigned a subset of the nodes in the business network to a network space;

receiving, by the computing system, an indication that the first user has shared the network space with a second user; and preventing, by the computing system and in response to identifying that the second user has access rights to only some of the nodes that the first user assigned to the network space, the second user from collaborating with the first user on the shared network space despite the first user having shared the network space with the second user.

9. The computer program product of claim 6, wherein some of the edges are pedestrian flow edges that represent a physical mailing of a letter between two of the participants of the business network.

10. The computer program product of claim 6, wherein some of the edges are participant link edges that represent an association between two of the participants of the business network, where the two participants of the business network that are connected with a participant link edge do not communicate electronically with each other and one of the two participants is a non-application entity that sends or receives physical goods and does not send or receive an electronic messages.

11. A system comprising:

one or more computers and one or more storage devices storing instructions that are operable, when executed by the one or more computers, to cause the one or more computers to perform operations comprising:

generating, by a computing system, an interactive display of a business network meta model graph that illustrates a business network, the interactive display of the meta model graph including nodes and edges that are displayed between the nodes, wherein each of the nodes represents a real world participant in the business network, and each of the edges represents a real world interaction between two of the participants of the business network, wherein some of the edges are peer to peer message flow edges that represent a direct communication between two of the participants in the business network without a middleware participant between the two participants, some of the edges are integration flow edges that represent a communication between two of the participants in the business network that involved a middleware participant between the two participants, and each of the integration flow edges is displayed with a particular graphical notation that is different than a graphical notation displayed for the peer to peer message flow edges;

presenting, by the computing system, the interactive display of the business network from a business application perspective in which each of the participants is identified as being a business entity;

presenting, by the computing system, the interactive display of the business network from an information technology perspective in which each of the participants is identified as being an application system; and receiving, by the computing system, user selection of a particular one of the integration flow edges that is shown as connecting a first participant of the participants in the business network to a second participant of the participants in the business network, and as a result causing the particular one of the integration flows to disappear from the display, and instead having the display present one or more middleware participants in connection to the first participant and the second participant with one or more of the peer to peer message flow edges.

12. The system of claim 11, wherein:

some of the participants represent real world retail stores and real world warehouses, and some of the edges represent shipping transactions from respective warehouses to respective retail stores.

13. The system of claim 11, the operations further comprising:

receiving, by the computing system, an indication that a first user has assigned a subset of the nodes in the business network to a network space;

receiving, by the computing system, an indication that the first user has shared the network space with a second user; and preventing, by the computing system and in response to identifying that the second user has access rights to only some of the nodes that the first user assigned to the network space, the second user from collaborating with the first user on the shared network space despite the first user having shared the network space with the second user.

14. The system of claim 11, wherein some of the edges are pedestrian flow edges that represent a physical mailing of a letter between two of the participants of the business network.

15. The system of claim 11, wherein some of the edges are participant link edges that represent an association between two of the participants of the business network, where the two participants of the business network that are connected with a participant link edge do not communicate electronically with each other and one of the two participants is a non-application entity that sends or receives physical goods and does not send or receive an electronic messages.

\* \* \* \* \*